US008491128B2

(12) United States Patent
Wu et al.

(10) Patent No.: US 8,491,128 B2
(45) Date of Patent: Jul. 23, 2013

(54) SYSTEM AND METHOD FOR PROJECTION CORRECTION BY CAPTURING PROJECTION IMAGE

(75) Inventors: Tai-Feng Wu, Tainan County (TW); Ching-Chang Chen, Kaohsiung (TW); Yu-Jen Wang, Taipei County (TW); Ming-Chieh Chou, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 329 days.

(21) Appl. No.: 12/885,701

(22) Filed: Sep. 20, 2010

(65) Prior Publication Data

US 2011/0164226 A1 Jul. 7, 2011

(30) Foreign Application Priority Data

Jan. 4, 2010 (TW) .............................. 99100031 A

(51) Int. Cl.
*G03B 21/00* (2006.01)
(52) U.S. Cl.
USPC .............................................. 353/70; 353/69
(58) Field of Classification Search
USPC ................ 353/69, 70, 121, 122, 76, 101
See application file for complete search history.

(56) References Cited

U.S. PATENT DOCUMENTS

| | | | | |
|---|---|---|---|---|
| 6,367,933 B1 * | 4/2002 | Chen et al. | ....................... | 353/69 |
| 6,527,395 B1 | 3/2003 | Raskar et al. | | |
| 6,753,907 B1 * | 6/2004 | Sukthankar et al. | ....... | 348/222.1 |
| 6,846,081 B2 * | 1/2005 | Mochizuki et al. | .............. | 353/70 |
| 7,036,940 B2 * | 5/2006 | Matsuda et al. | ................. | 353/70 |
| 7,266,240 B2 * | 9/2007 | Matsuda | ....................... | 382/167 |
| 7,290,887 B2 * | 11/2007 | Tamura et al. | ................... | 353/70 |
| 7,334,899 B2 | 2/2008 | Kobayashi | | |
| 7,347,564 B2 * | 3/2008 | Matsumoto et al. | ............ | 353/69 |
| 7,352,913 B2 * | 4/2008 | Karuta et al. | .................. | 382/275 |
| 7,360,904 B2 | 4/2008 | Kuwabara et al. | | |
| 7,401,929 B2 * | 7/2008 | Matsumoto et al. | ............ | 353/70 |
| 7,419,268 B2 | 9/2008 | Kobayashi | | |
| 7,422,331 B2 | 9/2008 | Matsuda | | |
| 7,452,084 B2 | 11/2008 | Mochizuki | | |
| 7,470,029 B2 | 12/2008 | Kobayashi | | |
| 7,475,995 B2 | 1/2009 | Matsumoto et al. | | |
| 7,484,854 B2 | 2/2009 | Miyasaka | | |
| 7,484,855 B2 | 2/2009 | Kobayashi et al. | | |
| 7,771,055 B2 * | 8/2010 | Matsumoto et al. | ............ | 353/69 |
| 7,871,167 B2 * | 1/2011 | Amano et al. | ................... | 353/70 |
| 8,009,929 B2 * | 8/2011 | Sakurai | ........................ | 382/286 |
| 8,025,414 B2 * | 9/2011 | Furui | .............................. | 353/69 |
| 8,142,029 B2 * | 3/2012 | Matsumoto et al. | ............ | 353/69 |
| 8,177,373 B2 * | 5/2012 | Furui | .............................. | 353/69 |
| 8,186,835 B2 * | 5/2012 | Furui | .............................. | 353/70 |
| 2004/0061838 A1 * | 4/2004 | Mochizuki et al. | ............. | 353/69 |
| 2005/0062939 A1 * | 3/2005 | Tamura | ........................... | 353/69 |
| 2005/0073660 A1 * | 4/2005 | Tamura et al. | ................... | 353/70 |
| 2005/0163396 A1 * | 7/2005 | Morichika et al. | ............ | 382/275 |

(Continued)

*Primary Examiner* — Georgia Y Epps
*Assistant Examiner* — Bao-Luan Le
(74) *Attorney, Agent, or Firm* — Rabin & Berdo, P.C.

(57) ABSTRACT

A method for projection correction includes following steps. An original image is projected as a projection image on an object. A projection-zone image including the projection image is captured from the object. A projection image outline corresponding to the projection image is obtained from the projection-zone image. An operation is performed on the projection image outline to obtain a horizontal inclination and a vertical inclination. The original image is pre-warped according to the horizontal inclination and the vertical inclination to obtain a corrected image, and the corrected image is projected on the object.

29 Claims, 8 Drawing Sheets

U.S. PATENT DOCUMENTS

| | | | |
|---|---|---|---|
| 2005/0280780 A1* | 12/2005 | Matsumoto et al. | 353/70 |
| 2006/0038962 A1* | 2/2006 | Matsumoto et al. | 353/69 |
| 2008/0204670 A1* | 8/2008 | Furui | 353/69 |
| 2008/0252860 A1* | 10/2008 | Matsumoto et al. | 353/70 |
| 2008/0284987 A1* | 11/2008 | Yonezawa | 353/70 |
| 2009/0040473 A1* | 2/2009 | Amano et al. | 353/70 |
| 2010/0045942 A1* | 2/2010 | Furui | 353/69 |
| 2010/0053569 A1* | 3/2010 | Furui | 353/70 |
| 2010/0103385 A1* | 4/2010 | Kubota | 353/70 |
| 2010/0103386 A1* | 4/2010 | Kubota | 353/70 |
| 2010/0123878 A1* | 5/2010 | Furui | 353/70 |
| 2010/0128231 A1* | 5/2010 | Furui | 353/70 |

* cited by examiner

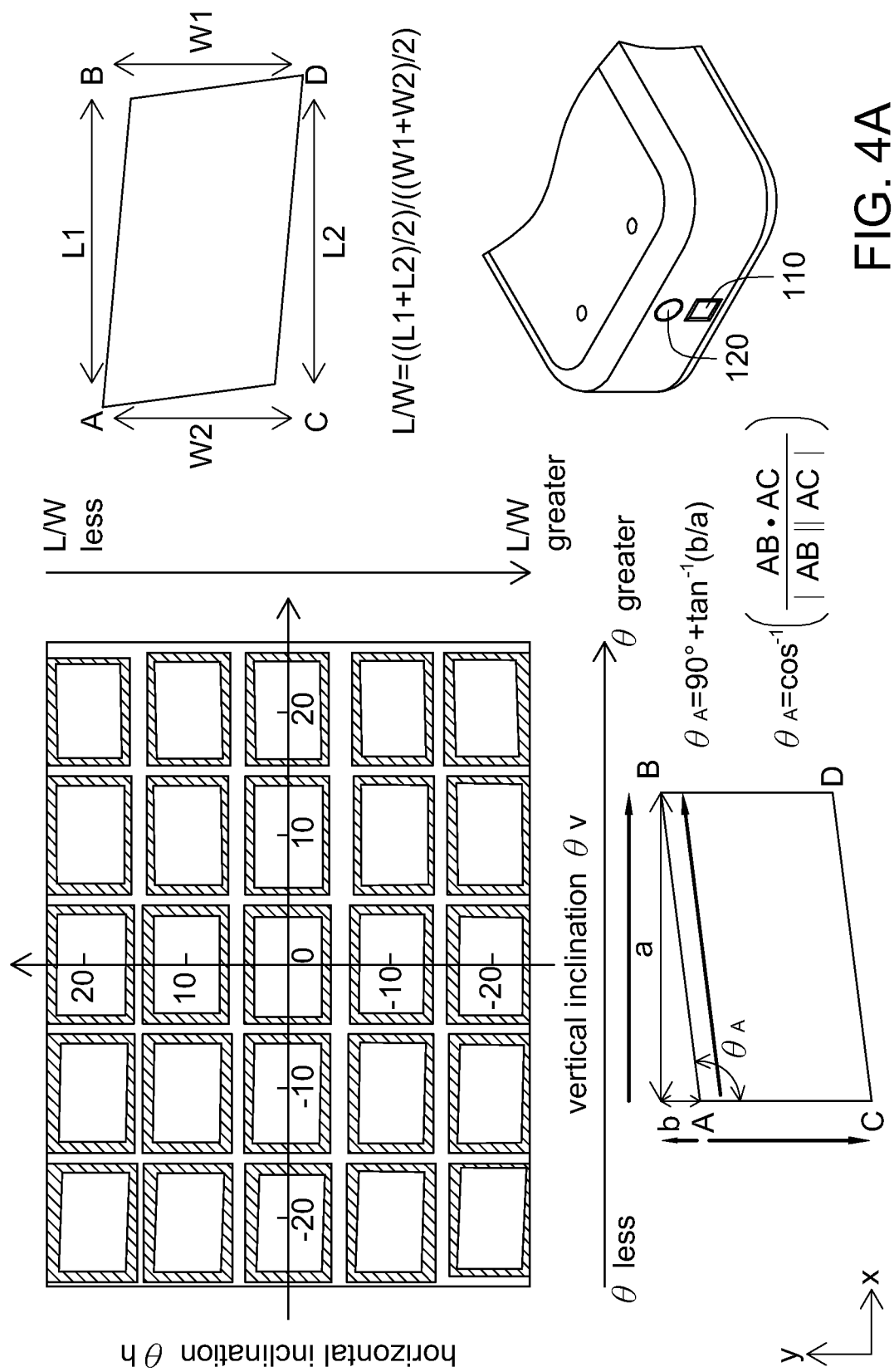

$\alpha = \tan^{-1}(D/L)$

SYSTEM AND METHOD FOR PROJECTION CORRECTION BY CAPTURING PROJECTION IMAGE

This application claims the benefit of Taiwan application Serial No. 99100031, filed Jan. 4, 2010, the subject matter of which is incorporated herein by reference.

BACKGROUND OF THE INVENTION

1. Field of the Invention

The invention relates in general to a system and a method for projection correction, and more particularly to a system and a method for real-time projection correction.

2. Description of the Related Art

Along with the development of projector in past years, digital projectors have already been one of indispensable multimedia tools, and are often applied to various use such as the family video and music, the digital teaching, the meeting report, and so on. Because of included angle problems, traditional projectors usually project original images on a projection screen with the trapezoid distortion phenomenon, thus generating distorted projection images. Therefore, the projectors generally provide the trapezoid correction function.

To improve the above trapezoid distortion phenomenon, an image processing system is disclosed in U.S. Pat. No. 7,470,029. In this image processing system, a projector projects an entirely-white testing image in advance to obtain a set of corner coordinates corresponding to the entirely-white testing image, and then projects an original image to obtain another set of corner coordinates corresponding to the original image. The image processing system compares the two sets of corner coordinates to obtain a distance between the projector and a projection screen, and then calculates the coordinates in the three-dimensional space to obtain a posture of the projector and accordingly corrects the projection image. However, the above image processing system is not suitable for real-time correction because of the calculation of the coordinates of multiple points and the complicated coordinate transformation.

Moreover, a method for correcting distorted images is disclosed in U.S. Pat. No. 6,753,907. The method utilizes projects and cameras disposed at different positions to capture the projection image and find out a transformation matrix between a projection image and a capture image, and find a transformation matrix between a projection screen and the capture image, and then obtains a transformation matrix between the projection image and the projection screen according to the above two transformation matrices. Said method for correcting distorted images corrects the projection image by utilizing the transformation matrix between the projection image and the projection screen. However, the above method for correcting distorted images is still not suitable for real-time correction because of the complicated calculation of these coordinate transformation matrices.

However, along with a high development of mobile devices, mobile-type hand-held micro projectors or micro projectors integrated in mobile devices have gradually broad applications. Because the micro projectors are not fixed, even shaking at any time, it has to perform a real-time trapezoid correction function of projection images in accordance with postures of the micro projectors. Therefore, the time-consuming image correction method with complicated calculation processes and heavy computation load is not suitable for the micro projectors.

SUMMARY OF THE INVENTION

The invention is directed to a system and a method for projection correction, which capture projection images and analyze image transformation information to obtain postures of a projection unit, and accordingly pre-warp the original images, thus being capable of real-time correcting the projection images rapidly and immediately.

According to a first aspect of the present invention, a system for projection correction is provided. The system includes a projection unit, an image capturing unit and an image processing unit. The projection unit projects an original image as a projection image on an object. The image capturing unit captures a projection-zone image including the projection image from the object. The image processing unit obtains a projection image outline corresponding to the projection image form the projection-zone image, and performs an operation on the projection image outline to obtain a horizontal inclination and a vertical inclination. The image processing unit pre-warps the original image according the horizontal inclination and the vertical inclination to obtain a pre-warped image and outputs the pre-warped image to the projection unit, so that the projection unit projects the pre-warped image on the object.

According to a second aspect of the present invention, a method for projection correction including following steps is provided. An original image is projected as a projection image on an object. A projection-zone image including the projection image is captured from the object. A projection image outline corresponding to the projection image is obtained from the projection-zone image. An operation is performed on the projection image outline to obtain a horizontal inclination and a vertical inclination. The original image is pre-warped according to the horizontal inclination and the vertical inclination to obtain a corrected image, and the corrected image is projected on the object.

The invention will become apparent from the following detailed description of the preferred but non-limiting embodiments. The following description is made with reference to the accompanying drawings.

BRIEF DESCRIPTION OF THE DRAWINGS

FIGS. 4A-4D shows schematic illustrations of included angles $\theta$ and length-width ratios L/W corresponding to projection image outlines according to an exemplary embodiment consistent with the invention.

DETAILED DESCRIPTION OF THE INVENTION

In exemplary embodiments consistent with the present invention, there is provided a system and a method for projection correction, which capture projection images and analyze image transformation information to obtain postures of a projection unit, and accordingly correct original images, thus being capable of real-time correcting the projection images rapidly and immediately.

Figure 1:
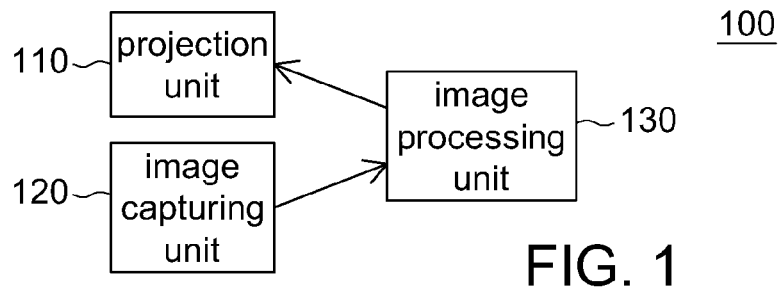
FIG. 1 shows a schematic illustration of a system for projection correction according to an exemplary embodiment consistent with the invention.

Referring to FIG. 1, a schematic illustration of a system for projection correction according to an exemplary embodiment consistent with the invention is shown. The system for projection correction 100 includes a projection unit 110, an image capturing unit 120 and an image processing unit 130. The system for projection correction 100 is applied to a micro projector, and the image capturing unit 120, for example, may be a camera or a digital camera built-in originally in mobile devices, without having to increase extra elements.

Figure 2:
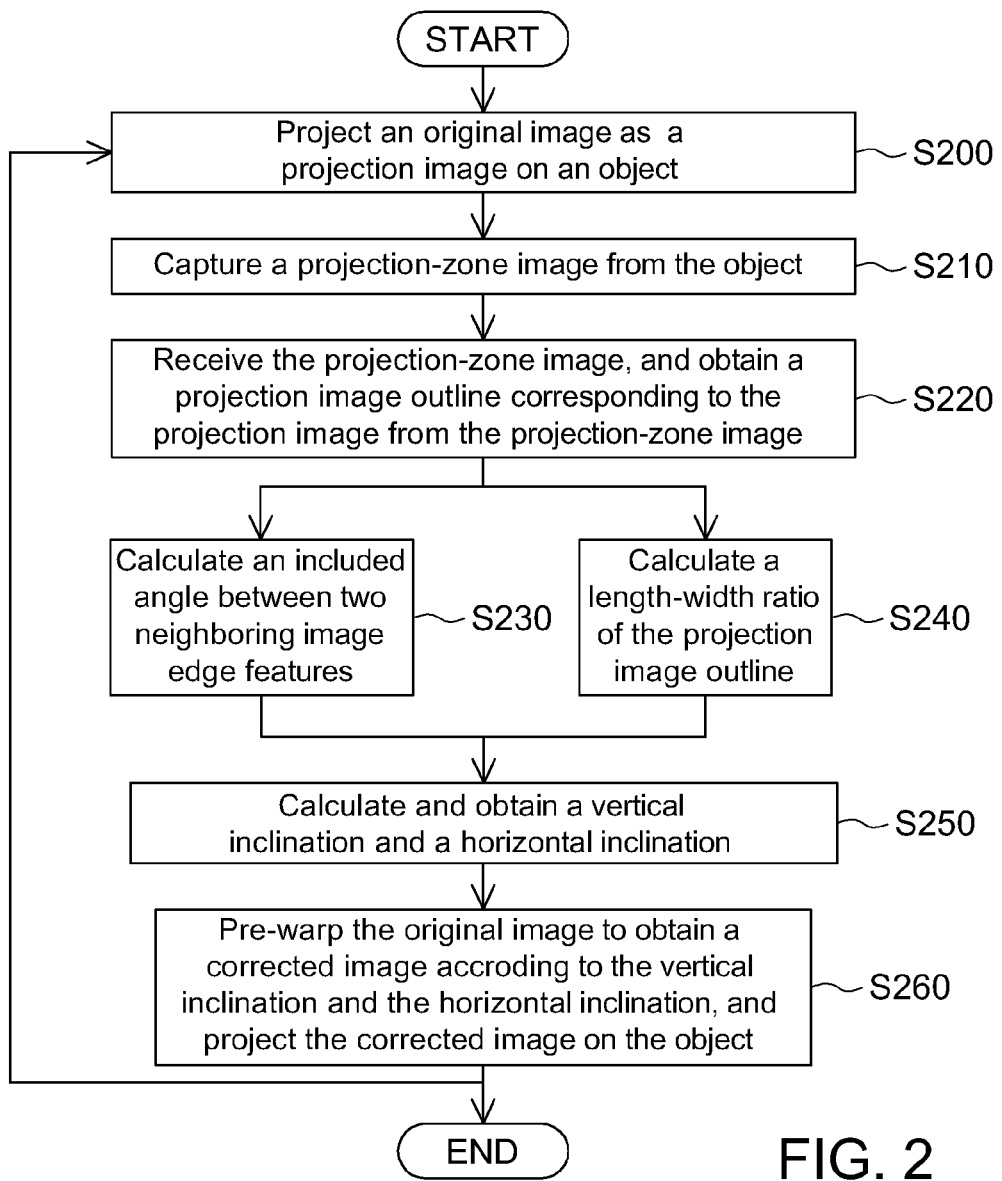
FIG. 2 shows a flow chart of a method for projection correction according to an exemplary embodiment consistent with the invention.

Referring to FIG. 2, a flow chart of a method for projection correction according to an exemplary embodiment consistent with the invention is shown. In step S200, the projection unit 110 projects an original image as a projection image on an object. The object may be a traditional projection screen, a wall, or any place on which images can be projected for identification. In step S210, the image capturing 120 captures a projection-zone image from the object. FIGS. 3A-3D shows schematic illustrations of projection-zone images according to an exemplary embodiment consistent with the invention. It can be obtained from FIG. 3A that the projection-zone image 140 substantially includes the projection image 150, having the trapezoid distortion phenomenon, and other backgrounds captured but not belong to the projection image.

Figure 3A:
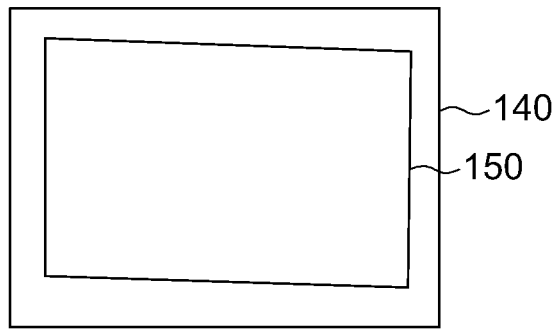
FIGS. 3A-3D shows schematic illustrations of projection-zone images according to an exemplary embodiment consistent with the invention.
Figure 3B:
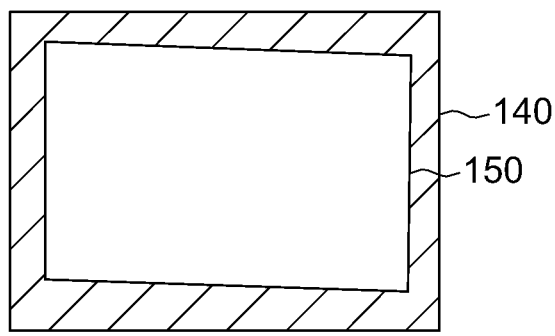
Figure 3C:
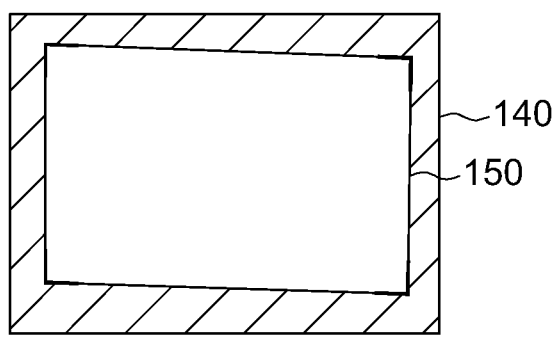
Figure 3D:
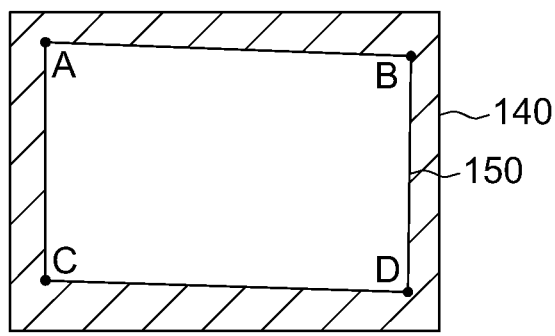

In step S220, the image processing unit 130 receives the projection-zone image 140, and obtains a projection image outline corresponding to the projection image 150 from the projection-zone image 140. As shown in FIG. 3B, the image processing unit 130 actually processes the projection-zone image 140 to obtain multiple image edge features. The projection image 150 has different brightness with the background as being projected, thus the projection image outline of the projection image 150 can be obtained easily by processing, without suffering from the environmental optical field. Afterwards, the image processing unit 130 captures multiple image edge features of the projection image outline as shown in FIG. 3C, and identifies the projection image outline based on the image edge features, as shown in FIG. 3D, to obtain coordinates of the four vertices A to D.

Figure 4B:
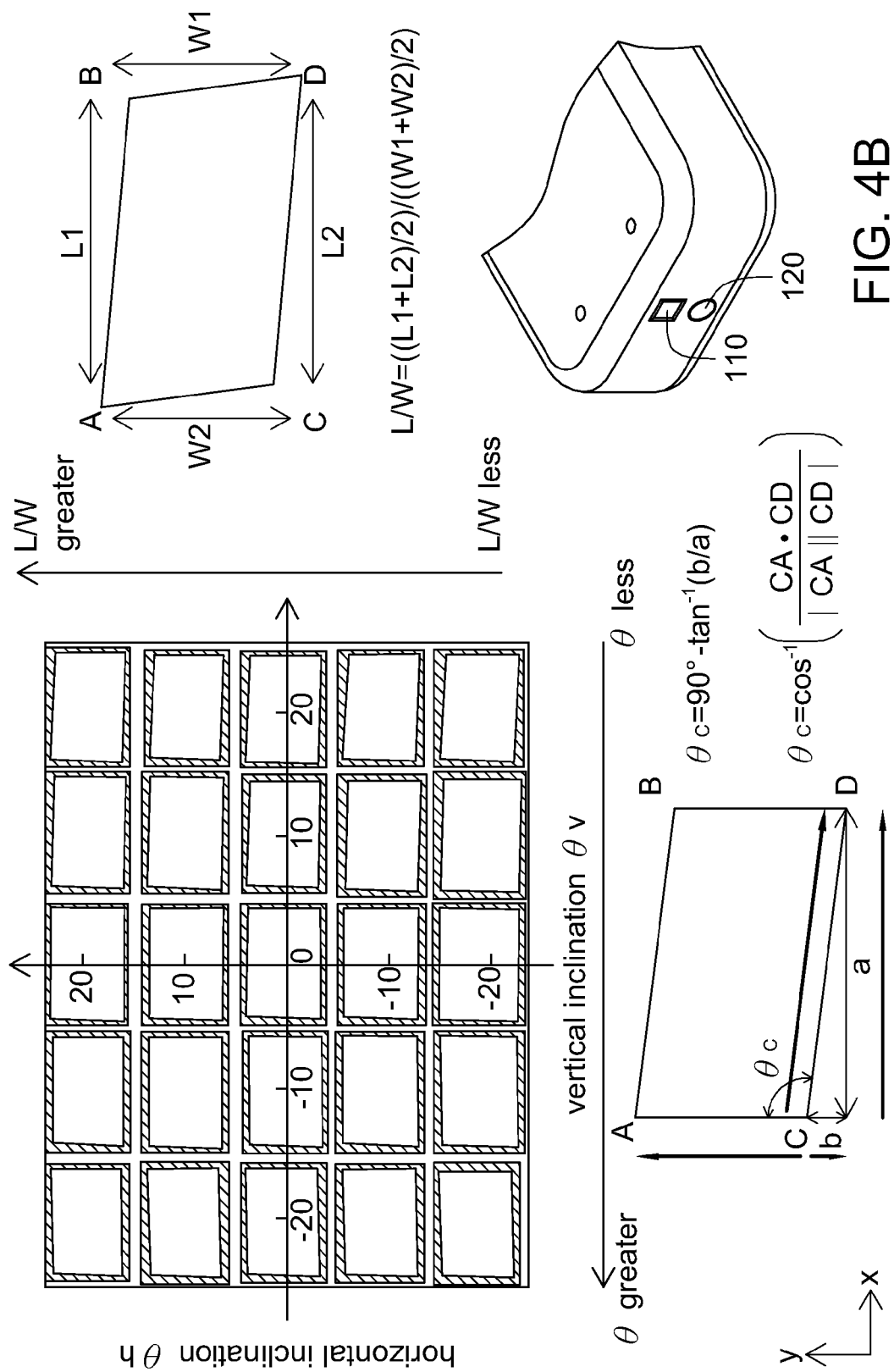
Figure 4C:
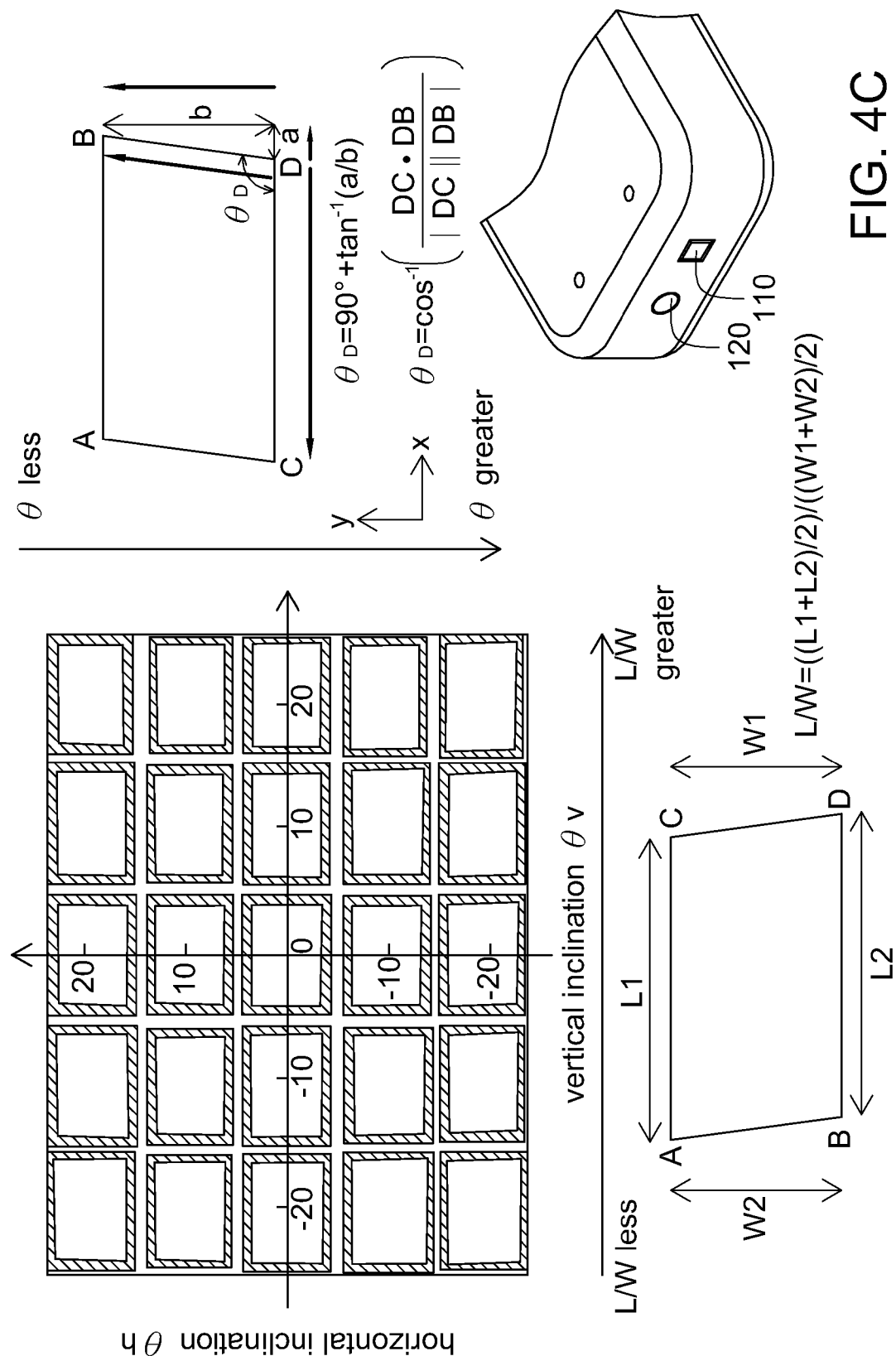
Figure 4D:
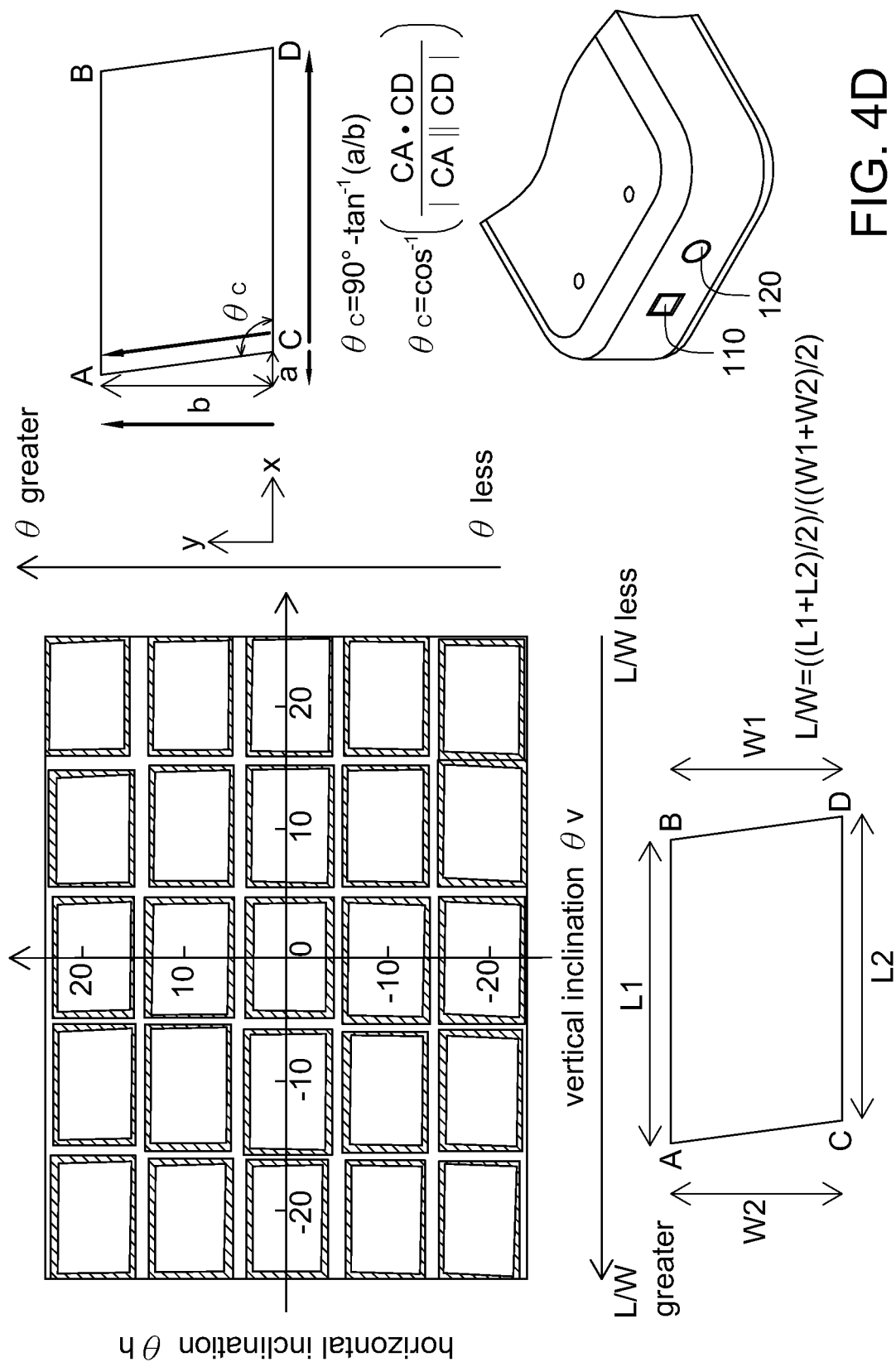

Next, in step S230, the image processing unit 130 calculates an included angle θ between two neighboring image edge features. Besides, in step S240, the image processing unit 130 calculates a length-width ratio L/W of the projection image outline. In step S250, a vertical inclination $\theta_v$ and a horizontal inclination $\theta_h$ of the projection unit 110 with respect to the object are obtained by calculating the included angle θ between two neighboring image edge features and the length-width ratio L/W of the projection image outline. FIGS. 4A-4D shows schematic illustrations of included angles θ and length-width ratios L/W corresponding to projection image outlines according to an exemplary embodiment consistent with the invention. In FIG. 4A, the projection unit 110 is disposed below the image capturing unit 120. In FIG. 4B, the projection unit 110 is disposed above the image capturing unit 120. In FIG. 4C, the projection unit 110 is disposed on the right side of the image capturing unit 120. In FIG. 4D, the projection unit 110 is disposed on the left side of the image capturing unit 120.

Take FIG. 4A as being exemplified. The coordinates of the fourth vertices A to D are obtained in step S220. Therefore, L1 represents the difference in abscissa between the vertices A and B in the image coordinate, or the vector length of the vector AB; L2 represents the difference in abscissa between the vertices C and D in the image coordinate, or the vector length of the vector CD; W1 represents the difference in ordinate between the vertices B and D in the image coordinate, or the vector length of the vector BD; W2 represents the difference in ordinate between the vertices A and C in the image coordinate, or the vector length of the vector AC. Therefore, the length-width ratio is characterized by the equation:

$$((L1+L2)/2)/((W1+W2)/2)$$

In addition, the included angle θ differs as the relative positions of the projection unit 110 and the image capturing unit 120 differ. As shown in FIG. 4A, an included angle $\theta_A$ varies with high sensitivity and can be obtained by the equation $\theta_A=90°+\tan^{-1}(b/a)$, wherein the vector coordinate reference take the vertex C as the origin of coordinates, and a and b are both vectors. Besides, the included angle $\theta_A$ may also be obtained by an inner product and the vector lengths by the vectors AB and AC; that is, $\theta_A=\cos^{-1}(AB \cdot AC/|AB||AC|)$. The vectors a and b are two vertical components of the vector AB. As shown in FIG. 4B, an included angle $\theta_C$ varies with high sensitivity and can be obtained by the equation $\theta_A=90°-\tan^{-1}(b/a)$, wherein the vector coordinate reference take the vertex C as the origin of coordinates, and a and b are both vectors. Besides, the included angle $\theta_C$ may also be obtained by an inner product and the vector lengths by the vectors CA and CD; that is, $\theta_A=\cos^{-1}(CA \cdot CD/|CA||CD|)$. The vectors a and b are two vertical components of the vector CD. As shown in FIG. 4C, an included angle $\theta_D$ varies with high sensitivity and can be obtained by the equation $\theta_D=90°+\tan^{-1}(a/b)$, wherein the vector coordinate reference take the vertex C as the origin of coordinates, and a and b are both vectors. Besides, the included angle $\theta_D$ may also be obtained by an inner product and the vector lengths by the vectors DC and DB; that is, $\theta_D=\cos^{-1}(DC \cdot DB/|DC||DB|)$. The vectors a and b are two vertical components of the vector DB. As shown in FIG. 4D, an included angle $\theta_C$ varies with high sensitivity and can be obtained by the equation $\theta_C=90°-\tan^{-1}(a/b)$, wherein the vector coordinate reference take the vertex C as the origin of coordinates, and a and b are both vectors. Besides, the included angle $\theta_C$ may also be obtained by an inner product and the vector lengths by the vectors CA and CD; that is, $\theta_C=\cos^{-1}(CA \cdot CD/|CA||CD|)$. The vectors a and b are two vertical components of the vector CA. In the above mentioned embodiments, FIG. 4A takes $\theta_A$ as the included angle θ, FIG. 4B takes $\theta_C$ as the included angle θ, FIG. 4C takes $\theta_D$ as the included angle θ, and FIG. 4D takes $\theta_C$ as the included angle θ. However, it is not limited thereto and people have skilled in the art should know that inner angles of the other three vertices may be taken as the included angle θ.

Besides, In FIGS. 4A-4D, upper right projection images and lower left projection images are illustrated for the convenience. In actual, projection images suffer from the trapezoid distortion phenomenon in various situations, and are not limited by the shown figures.

After calculating and obtaining the included angle θ in step S230, the image processing unit 130 substantially calculates to obtain the vertical inclination $\theta_v$ or the horizontal inclination $\theta_h$ according to the included angle θ (that is, $\theta_A$, $\theta_B$, $\theta_D$, and $\theta_C$) in step S250. For example, the vertical inclination $\theta_v$ or the horizontal inclination $\theta_h$ may be obtained by utilizing an interpolation method from a look up table, by calculation based on a fitting curve, or by transformation based on a mapping function. After calculating and obtaining the length-width ratio L/W in step S240, the image processing unit 130 substantially calculates to obtain the vertical inclination $\theta_v$ or the horizontal inclination $\theta_h$ according to the length-width ratio L/W in step S250. For example, the vertical inclination $\theta_v$ or the horizontal inclination $\theta_h$ may be obtained by utilizing an interpolation method from a look up table, by calculation based on a fitting curve, or by transformation via a mapping function. The look up table, the interpolation method, the fitting curve or the mapping function mentioned in step S250 are arranged and obtained by way of multiple experiments and observing multiple projection images at different vertical inclinations $\theta_v$ and horizontal inclinations $\theta_h$, or transform the included angle $\theta$ and the length-width L/W into the vertical inclination $\theta_v$ or the horizontal inclination $\theta_h$ by relationship functions obtained by calculating light paths directly. Multiple projection images at different vertical inclinations $\theta_v$ and horizontal inclinations $\theta_h$ have been shown in FIGS. 4A-4D. Take FIG. 4D for example. In FIG. 4D, the less the included angle $\theta_C$ ($\theta$), the less the vertical inclination $\theta_v$, and vice versa, the greater the included angle $\theta_C$, the greater the vertical inclination $\theta_v$. And the greater the length-width ratio L/W, the less the horizontal inclination $\theta_h$, and vice versa, the less the length-width ratio L/W, the greater the horizontal inclination $\theta_h$. Referring to FIGS. 4A, 4B, and 4C, there exist different results. Thus it may be known that the included angle $\theta$ and the horizontal inclination $\theta_h$ correspond to each other, and the length-width ratio L/W and the vertical inclination $\theta_v$ correspond to each other when the projection unit 110 and the image capturing unit 120 are disposed at relatively high-low positions. Meanwhile, the horizontal inclination $\theta_h$ is calculated according to the included angle $\theta$, and the vertical inclination $\theta_v$ is calculated according to the length-width ratio L/W. The included angle $\theta$ and the vertical inclination $\theta_v$ correspond to each other, and the length-width ratio L/W and the horizontal inclination $\theta_h$ correspond to each other when the projection unit 110 and the image capturing unit 120 are disposed at relatively right-left positions. Meanwhile, the horizontal inclination $\theta_h$ is calculated according to the length-width ratio L/W, and the vertical inclination $\theta_v$ is calculated according to the included angle $\theta$. In conclusion, the vertical inclination $\theta_v$ and the horizontal inclination $\theta_h$ are calculated and obtained according to the length-width ratio L/W and the included angle $\theta$. However, the relationship therebetween is decided according to the relative positions of the projection unit 110 and the image capturing unit 120, but is not limited thereto.

After obtaining the vertical inclination $\theta_v$ and the horizontal inclination $\theta_h$, in step S260, the image processing unit 130 pre-warps the original image to obtain a pre-warped image according to the vertical inclination $\theta_v$ and the horizontal inclination $\theta_h$. The image processing unit 130 outputs the pre-warped image to the projection unit 110, so that the projection unit 110 projects the pre-warped image on the object to obtain a correct projection image. Consequently, the trapezoid distortion problem of the projection image is solved. Moreover, the exemplary embodiment repeats steps S200-S260 of said projecting, said capturing, said performing the operation and said pre-distorting for real-time correction until the projection image is not distorted along with the shaking of the projection unit 110.

Figure 5A:
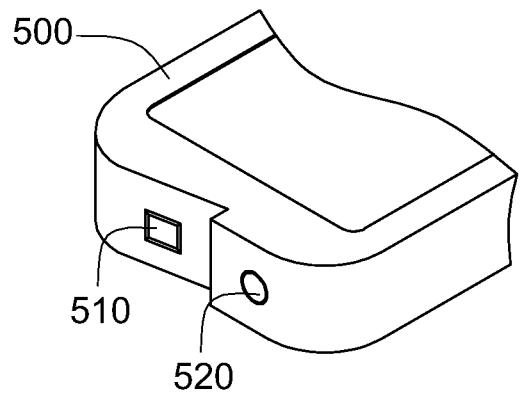
FIG. 5A shows a disposition diagram of a projection unit and an image capturing unit according to an exemplary embodiment consistent with the invention.
Figure 5B:
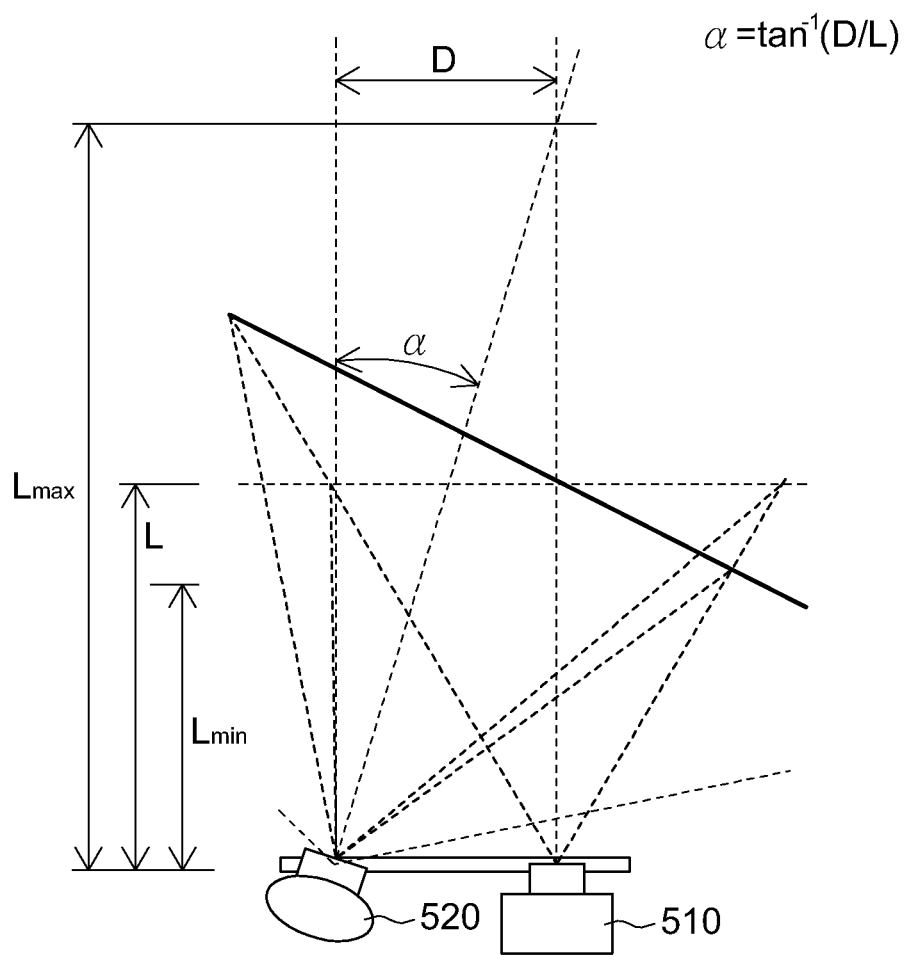
FIG. 5B shows a schematic illustration of optical axes of a projection unit and an image capturing unit according to an exemplary embodiment consistent with the invention.

Besides, an optical axis of the projection unit 110 and an optical axis of the image capturing unit 120 may be parallel or intersect. In detail, the optical axis that the original image and the pre-warped image are projected along and the optical axis the projection-zone image is captured along may be parallel or intersect. Referring to FIG. 5A and FIG. 5B, FIG. 5A shows a disposition diagram of a projection unit and an image capturing unit according to an exemplary embodiment consistent with the invention, and FIG. 5B shows a schematic illustration of optical axes of a projection unit and an image capturing unit according to an exemplary embodiment consistent with the invention. In FIG. 5A, the projection unit 510 and the image capturing unit 520 are disposed on two planes, not parallel, of the mobile device 500, such that the optical axes intersect. And corresponding to a distance D between the projection unit 510 and the image capturing unit 520 and different projection distances, $L_{max}$, L and $L_{mm}$, an appropriate angle $\alpha$ of the intersected optical axes can be designed and obtained as shown in FIG. 5B. The projection distance of the projection unit 510 is designed by the equation:

$$\alpha = \tan^{-1}(D/L)$$

In above projection distance equation, $\alpha$ represents an intersection angle of the optical axes, D represents a distance between the projection unit 510 and the image capturing unit 520, and L represents a projection distance. In an embodiment, assume that the distance D between the projection unit 510 and the image capturing unit 520 is 5 cm. If the maximum projection distance $L_{max}$ of the projection 510 is 300 cm, the intersection angle $\alpha_{max}$ will be 0.9548°, and if the minimum projection distance $L_{min}$ of the projection 510 is 30 cm, the intersection angle $\alpha_{min}$ will be 9.4623°. Therefore, appropriate parameters can be designed according to user's requirements.

Figure 6A:
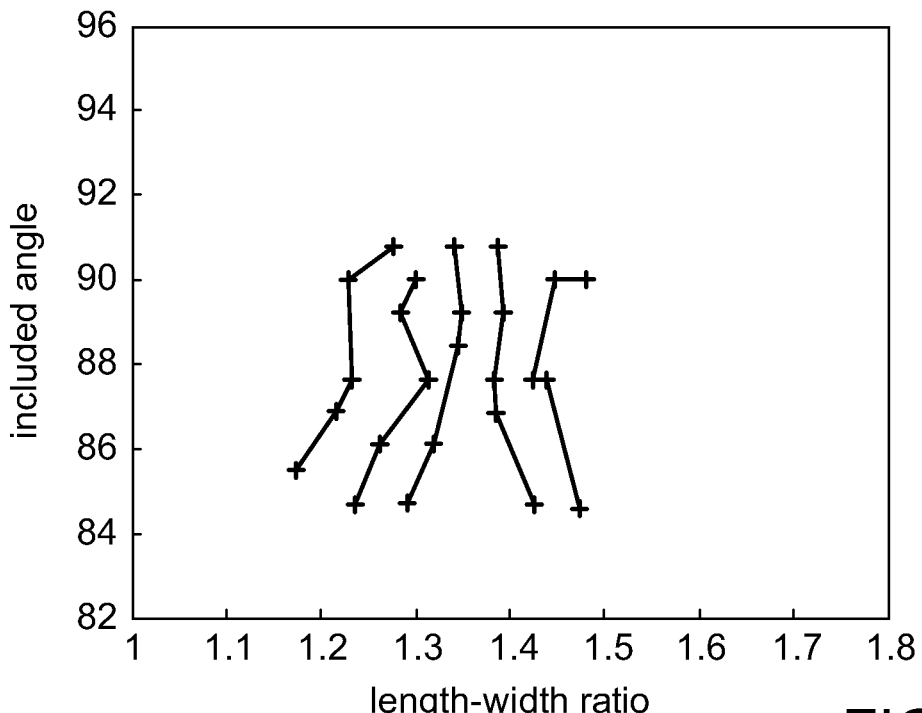
FIG. 6A shows a schematic illustration of the included angle with respect to the length-width ratio when the optical axes of the projection unit and the image capturing unit are parallel.
Figure 6B:
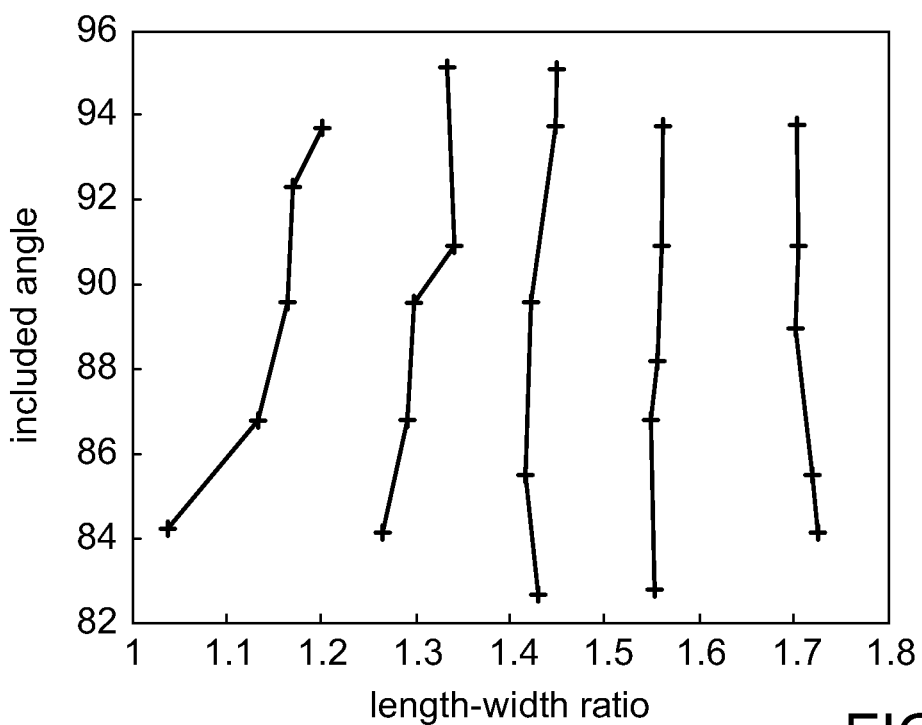
FIG. 6B shows a schematic illustration of the included angle with respect to the length-width ratio when the optical axes of the projection unit and the image capturing unit intersect.

If the optical axes of the projection unit and the image capturing unit intersect, the resolution of the image is improved. Referring to FIG. 6A and FIG. 6B. FIG. 6A shows a schematic illustration of the included angle with respect to the length-width ratio when the optical axes of the projection unit and the image capturing unit are parallel, as shown in FIG. 4A, FIG. 4B, FIG. 4C and FIG. 4D. FIG. 6B shows a schematic illustration of the included angle with respect to the length-width ratio when the optical axes of the projection unit and the image capturing unit intersect, as shown in FIG. 5A and FIG. 5B. It can be known by the comparison between FIG. 6A and FIG. 6B that, variations in the included angles $\theta$ and the length-width ratios L/W are more obvious when the optical axes intersect than when the optical axes are parallel, thus it is easy to perform the interpolation to obtain the included angles and the length-width ratios more accurately.

The system and the method for projection correction disclosed in the above embodiments of the invention has many advantages exemplified below.

The system and the method for projection correction of the invention capture projection images and analyze image transformation information, and obtain horizontal inclinations and vertical inclinations according to included angles and length-widths ratios of the projection images. Thus, postures of a projection unit can be obtained without complicated coordinate operations and matrix transformations, and original images can be corrected according to the postures. Consequently, the trapezoid distortion problems of the projection images are solved rapidly without having to process pre-correction steps. Furthermore, because of simple calculation, the projection images can be corrected in real-time without overall system resources consuming and extra element. Therefore, the system and the method for projection correction are suitable for all kinds of mobile devices, are not limited thereto.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A system for projection correction, the system comprising:
   a projection unit for projecting an original image as a projection image on an object;
   an image capturing unit for capturing a projection-zone image from the object, the projection-zone image including the projection image; and
   an image processing unit for obtaining a projection image outline corresponding to the projection image from the projection-zone image, and performing an operation on the projection image outline to obtain a horizontal inclination and a vertical inclination; wherein
   wherein the image processing unit processes the projection-zone image to obtain a plurality of image edge features, and identifies the projection image outline based on the image edge features,
   the image processing unit calculates a length-width ratio of the projection image outline,
   the image processing unit performs a calculation to obtain the vertical inclination according to the length-width ratio; and
   the image processing unit pre-warps the original image according the horizontal inclination and the vertical inclination to obtain a corrected image and outputs the corrected image to the projection unit, so that the projection unit projects the corrected image on the object.

2. The system according to claim 1, wherein an optical axis of the projection unit and an optical axis of the image capturing unit are parallel.

3. The system according to claim 1, wherein an optical axis of the projection unit and an optical axis of the image capturing unit intersect.

4. The system according to claim 1, wherein the image processing unit calculates an included angle between two neighboring image edge features.

5. The system according to claim 4, wherein the image processing unit calculates to obtain the vertical inclination according to the included angle.

6. The system according to claim 4, wherein the image processing unit calculates to obtain the horizontal inclination according to the included angle.

7. A system for projection correction, the system comprising:
   a projection unit for projecting an original image as a projection image on an object;
   an image capturing unit for capturing a projection-zone image from the object, the projection-zone image including the projection image; and
   an image processing unit for obtaining a projection image outline corresponding to the projection image from the projection-zone image, and performing an operation on the projection image outline to obtain a horizontal inclination and a vertical inclination;
   wherein the image processing unit processes the projection-zone image to obtain a plurality of image edge features, and identifies the projection image outline based on the image edge features; the image processing unit calculates a length-width ratio of the projection image outline; the image processing unit calculates to obtain the horizontal inclination according to the length-width ratio; and the image processing unit pre-warps the original image according the horizontal inclination and the vertical inclination to obtain a corrected image and outputs the corrected image to the projection unit, so that the projection unit projects the corrected image on the object.

8. The system according to claim 7, wherein an optical axis of the projection unit and an optical axis of the image capturing unit are parallel.

9. The system according to claim 7, wherein an optical axis of the projection unit and an optical axis of the image capturing unit intersect.

10. The system according to claim 7, wherein the image processing unit calculates an included angle between two neighboring image edge features.

11. The system according to claim 10, wherein the image processing unit calculates to obtain the vertical inclination according to the included angle.

12. The system according to claim 10, wherein the image processing unit calculates to obtain the horizontal inclination according to the included angle.

13. A method for projection correction, the method comprising:
    projecting an original image as a projection image on an object;
    capturing a projection-zone image from the object, the projection-zone image including the projection image;
    processing the projection-zone image to obtain a plurality of image edge features, and identifying a projection image outline based on the image edge features;
    calculating a length-width ratio of the projection image outline;
    performing an operation on the projection image outline to obtain a horizontal inclination and a vertical inclination, wherein the vertical inclination is calculated according to the length-width ratio; and
    pre-warping the original image according the horizontal inclination and the vertical inclination to obtain a corrected image, and projecting the corrected image on the object.

14. The method according to claim 13, further repeating steps of said projecting, said capturing, said performing the operation and said pre-warping for real-time correction.

15. The method according to claim 13, wherein an optical axis of projecting the original image and the corrected image and an optical axis of capturing the projection-zone image are parallel.

16. The method according to claim 13, wherein an optical axis of projecting the original image and the corrected image and an optical axis of capturing the projection-zone image intersect.

17. The method according to claim 13, wherein the calculating performed according to the length-width ratio is based on a look up table, an interpolation method, a fitting curve, or a mapping function.

18. The method according to claim 13, further comprising: calculating an included angle between two neighboring image edge features.

19. The method according to claim 18, wherein the vertical inclination is calculated according to the included angle.

20. The method according to claim 18, wherein the horizontal inclination is calculated according to the included angle.

21. The method according to claim 18, wherein the calculating performed according to the included angle is based on a look up table, an interpolation method, a fitting curve, or a mapping function.

22. A method for projection correction, the method comprising:
- projecting an original image as a projection image on an object;
- capturing a projection-zone image from the object, the projection-zone image including the projection image;
- processing the projection-zone image to obtain a plurality of image edge features, and identifying a projection image outline based on the image edge features;
- calculating a length-width ratio of the projection image outline;
- performing an operation on the projection image outline to obtain a horizontal inclination and a vertical inclination, wherein the horizontal inclination is calculated according to the length-width ratio; and
- pre-warping the original image according the horizontal inclination and the vertical inclination to obtain a corrected image, and projecting the corrected image on the object.

23. The method according to claim 22, further repeating steps of said projecting, said capturing, said performing the operation and said pre-warping for real-time correction.

24. The method according to claim 22, wherein an optical axis of projecting the original image and the corrected image and an optical axis of capturing the projection-zone image are parallel.

25. The method according to claim 22, wherein an optical axis of projecting the original image and the corrected image and an optical axis of capturing the projection-zone image intersect.

26. The method according to claim 22, further comprising: calculating an included angle between two neighboring image edge features.

27. The method according to claim 26, wherein the vertical inclination is calculated according to the included angle.

28. The method according to claim 26, wherein the horizontal inclination is calculated according to the included angle.

29. The method according to claim 26, wherein the calculating performed according to the included angle is based on a look up table, an interpolation method, a fitting curve, or a mapping function.

* * * * *